Patented June 8, 1937

2,082,946

UNITED STATES PATENT OFFICE 2,082,946

PROCESS OF PREPARING BETA-BROM-ETHYL BENZENE

Maurice Fluchaire, Tarare, and Serge Javorski, Lyon, France, assignors, to Societe des Usines Chimiques Rhone, Pouienc, Paris, France, a corporation of France No Drawing. Application September 21, 1935, Serial No. 41,516. In Great Britain September 25, 1934

8 Claims. (Cl. 260—160)

The present invention relates to the preparation of beta bromethylbenzene.

Up to the present, beta bromethylbenzene has only been obtained by the action of hydrobromic acid or the bromides of phosphorus on beta phenylethyl alcohol or its phenolic ether.

Hydrobromic acid has been combined with styrene by mixing styrene at ordinary temperatures either with a saturated aqueous solution of hydrobromic acid (Bernthsen & Bender, Berichte 1882, 15, pages 1982 to 1986; and Schramm, Berichte 1893, 26 pages 1709 to 1711) or with a solution of hydrobromic acid in glacial acetic acid (Ashworth & Burkhardt, Journal of the Chemical Society 1928, pages 1791 to 1802). Under these conditions only alpha bromethylbenzene is obtained.

This invention has as an object the provision of a novel and easily conducted process for preparing beta bromethylbenzene from relatively cheap starting materials. A further object is to provide suitable solvents and catalysts for promoting the preparation of beta bromethylbenzene. Other objects will appear hereinafter.

These objects are accomplished by the following invention according to which beta bromethylbenzene is made by combining styrene with hydrogen bromide under suitable conditions.

According to the present invention, it has been found that, contrary to what has hitherto been known, hydrogen bromide may be combined with styrene to form beta bromethylbenzene when the operation is carried out above ordinary temperatures by using a solution of styrene in a solvent which does not react with hydrogen bromide. Certain solvents such as ethylbenzene, chlorbenzene, and brombenzene, are particularly active in promoting the attachment of the bromine atom in the beta position. The yield may be increased so as to obtain a nearly quantitative yield of the beta product by using a catalyst such as peroxides or peracids.

The following examples illustrate various ways in which the invention may be carried out in practice, but it is to be understood that these examples are in no way limitative.

Example 1

200 grams of ethylbenzene are heated to 125° C. in a glass apparatus fitted with a stirrer. A current of hydrogen bromide is caused to bubble through at a rate of 0.6 gram per minute, and there is then added regularly during 40 minutes a solution of 20.8 grams of styrene in 42 grams of ethylbenzene. 10 minutes after the addition of this has been concluded, the contents of the apparatus are washed with a solution of sodium bicarbonate, and the product is then dried and distilled under reduced pressure.

16 grams of a mixture is obtained containing 63% of alpha bromethylbenzene and 30% of beta bromethylbenzene.

Example 2

2.4 grams of benzoyl peroxide are added to the solution of styrene specified in Example 1, and the reaction is carried out at 95° C. 35 grams of a mixture is obtained containing 7% of alpha bromethylbenzene and 92% of beta bromethylbenzene.

Example 3

83.2 grams of styrene and 1.9 grams of benzoyl peroxide are dissolved in 168 grams of chlorbenzene. This solution is allowed to run into 74 grams of chlorbenzene heated to 97–98° C., the addition taking 45 minutes during which time a current of gaseous hydrogen bromide is passed in at the rate of 2.5 grams per minute with vigorous stirring. 143.3 grams of a mixture containing 21% of alpha bromethylbenzene and 79% of beta bromethylbenzene is obtained when the product of reaction is subsequently distilled.

Example 4

In the same apparatus as in Example 1, 200 grams of benzene are heated to 50° C. while a current of gaseous hydrogen bromide is caused to bubble through. There is then added regularly during 55 minutes a solution of 20.8 grams of styrene and 2.4 grams of benzoyl peroxide in 42 grams of benzene.

After a treatment similar to that of Example 1, 31.3 grams of a mixture is obtained containing 68% of alpha-bromethylbenzene and 32% of beta-bromethylbenzene.

While the reaction proceeds favorably at temperatures between 40° C. and the boiling point of styrene, it is preferred to conduct the reaction at a temperature between 90° C. and 100° C.

Beta bromethylbenzene may be employed as a starting material in a number of organic syntheses. It may be saponified in order to produce phenylethyl alcohol. This latter use is of considerable importance, since phenylethyl alcohol is widely used as a constituent of perfumes.

The process hereinbefore described enables beta bromethylbenzene to be produced far more cheaply than was heretofore possible.

As many apparently widely different embodiments of this invention may be made without widely departing from the spirit and scope thereof, it is to be understood that the invention is not limited to the specific embodiments thereof except as defined in the appended claims.

We claim:

1. A process for the preparation of beta bromethylbenzene which comprises combining hydrogen bromide with styrene at a temperature between 40° C. and the boiling point of styrene in a solution in an organic solvent which does not react with hydrogen bromide.

2. A process according to claim 1 in which ethylbenzene is used as the solvent.

3. A process according to claim 1 in which a halogenated benzene is used as the solvent.

4. A process for the preparation of beta bromethylbenzene which comprises combining hydrogen bromide with styrene in a solution in an aromatic solvent which does not react with hydrogen bromide, said reaction being carried out at a temperature between 90° and 100° C. and in the presence of a catalyst of the peroxidic type.

5. A process according to claim 4 in which the aromatic solvent used is ethylbenzene.

6. A process according to claim 4 in which the aromatic solvent used is chlorbenzene.

7. A process according to claim 4 in which the catalyst that is used is benzoyl peroxide.

8. A process for the preparation of beta bromethylbenzene which comprises simultaneously passing gaseous hydrogen bromide and running a solution of styrene in ethylbenzene which also contains benzoyl peroxide, into a body of ethylbenzene which is heated to a temperature between 90° and 100° C.

MAURICE FLUCHAIRE.
SERGE JAVORSKI.